(12) United States Patent
Rao et al.

(10) Patent No.: US 9,301,237 B1
(45) Date of Patent: Mar. 29, 2016

(54) SERVER CONTROL AND DEFINED SOFTWARE NETWORKING

(71) Applicants: IP Holdings, Inc., Palo Alto, CA (US);
Sanjay K Rao, Palo Alto, CA (US);
Sunil K Rao, Palo Alto, CA (US);
Rekha K Rao, Palo Alto, CA (US)

(72) Inventors: Sanjay K Rao, Palo Alto, CA (US);
Sunil K Rao, Palo Alto, CA (US);
Raman K Rao, Palo Alto, CA (US)

( * ) Notice: Subject to any disclaimer, the term of this patent is extended or adjusted under 35 U.S.C. 154(b) by 0 days.

(21) Appl. No.: 14/634,910

(22) Filed: Mar. 2, 2015

Related U.S. Application Data

(63) Continuation of application No. 14/493,343, filed on Sep. 22, 2014, now Pat. No. 8,982,863, which is a continuation of application No. 14/139,817, filed on Dec. 23, 2013, now Pat. No. 8,842,653, which is a continuation of application No. 12/912,607, filed on Oct. 26, 2010, now Pat. No. 8,824,434, which is a continuation of application No. 10/940,428, filed on Sep. 13, 2004, now Pat. No. 7,848,300, which is a continuation of application No. 09/617,608, filed on Jul. 17, 2000, now Pat. No. 7,286,502.

(51) Int. Cl.
| | |
|---|---|
| *H04W 4/00* | (2009.01) |
| *H04W 40/02* | (2009.01) |
| *H04W 88/06* | (2009.01) |
| *H04W 36/22* | (2009.01) |
| *H04W 80/04* | (2009.01) |
| *H04W 84/12* | (2009.01) |

(52) U.S. Cl.
CPC .............. *H04W 40/02* (2013.01); *H04W 36/22* (2013.01); *H04W 80/04* (2013.01); *H04W 88/06* (2013.01); *H04W 84/12* (2013.01)

(58) Field of Classification Search
None
See application file for complete search history.

(56) References Cited

U.S. PATENT DOCUMENTS

| | | |
|---|---|---|
| 4,654,867 A | 3/1987 | Labedz |
| 4,675,653 A | 6/1987 | Priestley |
| 5,025,486 A | 6/1991 | Klughart |
| 5,121,391 A | 6/1992 | Paneth et al. |
| 5,195,130 A | 3/1993 | Weiss et al. |
| 5,379,341 A | 1/1995 | Wan |
| 5,410,738 A | 4/1995 | Diepstraten et al. |

(Continued)

OTHER PUBLICATIONS

U.S. Appl. No. 13/621,294, filed Sep. 17, 2012; Inventors: Sunil K. Rao, Sanjay K. Rao, Raman K. Rao.

(Continued)

*Primary Examiner* — Phirin Sam

(57) ABSTRACT

Many concentric/overlaying networks exist in one or more wired or wireless networks simultaneously. The network box or mobile device may use one or more transmission protocols as deemed optimal and appropriate by the local server or the super server located in a LAN, WAN or the Internet. The units have the ability to multiplex between one or more transmission protocols. T/R may be located within or in close proximity to computer system to route the data. The software capability that is resident at the server level is capable of dynamically determining a number of factors for best data transfer, the best transmission frequencies and protocols, the best error correction and channel coding algorithms and multiplexes the transmission paths and tasks. Various optical and wireless protocols can co-exist in a network. Multiple communication environments are enabled by the data paths having devices such as CT/MDs, network switch boxes, and combinations.

19 Claims, 5 Drawing Sheets

(56) References Cited

U.S. PATENT DOCUMENTS

| | | | |
|---|---|---|---|
| 5,457,714 A | 10/1995 | Engel et al. | |
| 5,465,401 A | 11/1995 | Thompson | |
| 5,507,035 A | 4/1996 | Bantz et al. | |
| 5,513,242 A | 4/1996 | Mukerjee et al. | |
| 5,517,553 A | 5/1996 | Sato | |
| 5,533,029 A | 7/1996 | Gardner | |
| 5,539,391 A | 7/1996 | Yuen | |
| 5,546,429 A | 8/1996 | Chiasson et al. | |
| 5,555,258 A | 9/1996 | Snelling et al. | |
| 5,559,794 A | 9/1996 | Willis et al. | |
| D374,675 S | 10/1996 | Sakai et al. | D14/242 |
| 5,565,929 A | 10/1996 | Tanaka | |
| 5,566,205 A | 10/1996 | Delfine | |
| 5,577,118 A | 11/1996 | Sasaki et al. | |
| 5,579,341 A | 11/1996 | Smith et al. | 375/267 |
| 5,598,407 A | 1/1997 | Bud et al. | |
| 5,610,617 A | 3/1997 | Gans et al. | |
| 5,633,742 A | 5/1997 | Shipley | |
| 5,636,211 A | 6/1997 | Newlin et al. | |
| 5,691,974 A | 11/1997 | Zehavi et al. | |
| 5,745,884 A | 4/1998 | Carnegie et al. | |
| 5,802,469 A | 9/1998 | Nounin et al. | |
| 5,812,951 A | 9/1998 | Ganesan et al. | 455/445 |
| 5,816,918 A | 10/1998 | Kelly et al. | |
| 5,828,658 A | 10/1998 | Ottersten et al. | |
| 5,889,816 A * | 3/1999 | Agrawal et al. | 375/220 |
| 5,909,183 A | 6/1999 | Borgstahl et al. | |
| 5,960,039 A | 9/1999 | Martin et al. | |
| 5,960,344 A | 9/1999 | Mahany | 455/432.2 |
| 6,009,130 A | 12/1999 | Lurey et al. | 375/347 |
| 6,049,721 A | 4/2000 | Serizawa | 455/509 |
| 6,058,422 A | 5/2000 | Ayanoglu et al. | |
| 6,067,290 A | 5/2000 | Paulraj et al. | |
| 6,072,994 A | 6/2000 | Phillips et al. | |
| 6,091,365 A | 7/2000 | Derneryd et al. | 343/700 MS |
| 6,101,531 A * | 8/2000 | Eggleston et al. | 709/206 |
| 6,108,314 A | 8/2000 | Jones et al. | |
| 6,112,206 A * | 8/2000 | Morris et al. | |
| 6,115,427 A | 9/2000 | Calderbank et al. | 375/267 |
| 6,119,179 A | 9/2000 | Whitridge et al. | 710/72 |
| 6,128,489 A | 10/2000 | Seazholtz et al. | |
| 6,138,030 A * | 10/2000 | Coombes et al. | 455/507 |
| 6,154,658 A | 11/2000 | Caci | 455/466 |
| 6,167,099 A | 12/2000 | Rader et al. | |
| 6,167,253 A | 12/2000 | Farris | 455/412.2 |
| 6,169,789 B1 | 1/2001 | Rao et al. | |
| 6,185,205 B1 * | 2/2001 | Sharrit et al. | 370/389 |
| 6,246,688 B1 | 6/2001 | Angwin et al. | |
| 6,246,875 B1 | 6/2001 | Seazholtz | 455/432.1 |
| 6,285,861 B1 | 9/2001 | Bonaccorso | 455/137 |
| 6,370,129 B1 | 4/2002 | Huang | 370/329 |
| 6,377,570 B1 | 4/2002 | Vaziri et al. | |
| 6,393,014 B1 * | 5/2002 | Daly et al. | 370/352 |
| 6,405,049 B2 * | 6/2002 | Herrod et al. | 455/517 |
| 6,456,610 B1 | 9/2002 | Briley | |
| 6,466,558 B1 | 10/2002 | Ling | |
| 6,480,149 B1 * | 11/2002 | Sutherland et al. | 342/357.52 |
| 6,483,820 B1 * | 11/2002 | Davidson et al. | 370/329 |
| 6,493,331 B1 | 12/2002 | Walton et al. | 370/341 |
| 6,496,979 B1 | 12/2002 | Chen | 717/178 |
| 6,505,175 B1 * | 1/2003 | Silverman et al. | 705/36 R |
| 6,515,978 B1 | 2/2003 | Buehrer et al. | 370/342 |
| 6,519,478 B1 | 2/2003 | Scherzer et al. | |
| 6,542,556 B1 | 4/2003 | Kuchi et al. | 375/299 |
| 6,542,736 B1 | 4/2003 | Parkvall et al. | |
| 6,549,534 B1 | 4/2003 | Shaffer et al. | |
| 6,570,871 B1 | 5/2003 | Schneider | |
| 6,600,734 B1 | 7/2003 | Gernert et al. | |
| 6,628,702 B1 | 9/2003 | Rowitch | 375/150 |
| 6,640,086 B2 | 10/2003 | Wall | |
| 6,659,947 B1 | 12/2003 | Carter | 600/300 |
| 6,677,894 B2 | 1/2004 | Sheynblat | 342/357.46 |
| 6,721,306 B1 * | 4/2004 | Farris et al. | 370/352 |
| 6,757,265 B1 * | 6/2004 | Sebastian et al. | 370/319 |
| 6,775,285 B1 | 8/2004 | Moles | 370/392 |
| 6,826,174 B1 | 11/2004 | Erekson et al. | 370/352 |
| 6,865,169 B1 | 3/2005 | Quayle et al. | |
| 6,895,253 B1 | 5/2005 | Carloni et al. | |
| 6,928,280 B1 * | 8/2005 | Xanthos et al. | 455/423 |
| 6,952,454 B1 | 10/2005 | Jalali et al. | 375/260 |
| 6,970,183 B1 * | 11/2005 | Monroe | 348/143 |
| 7,027,773 B1 | 4/2006 | McMillin | |
| 7,039,370 B2 | 5/2006 | Laroia et al. | |
| 7,068,624 B1 * | 6/2006 | Dantu et al. | 370/331 |
| 7,099,695 B1 | 8/2006 | Ngan | |
| 7,209,955 B1 * | 4/2007 | Major et al. | 709/207 |
| 7,215,718 B1 | 5/2007 | Calderbank et al. | 375/299 |
| 7,277,679 B1 | 10/2007 | Barratt et al. | |
| 7,286,502 B1 | 10/2007 | Rao et al. | |
| 7,296,091 B1 * | 11/2007 | Dutta et al. | 709/245 |
| 7,643,848 B2 | 1/2010 | Robinett | |
| 7,848,300 B1 | 12/2010 | Rao et al. | |
| 8,019,991 B1 | 9/2011 | Moles | 713/160 |
| 8,295,406 B1 | 10/2012 | Sorrells | 375/340 |
| 8,824,434 B2 | 9/2014 | Rao | 370/338 |
| 8,842,653 B1 | 9/2014 | Rao | 370/338 |
| 8,964,712 B1 | 2/2015 | Rao | 370/338 |
| 8,982,863 B1 | 3/2015 | Rao | 370/338 |
| 9,019,946 B1 | 4/2015 | Rao | 370/338 |
| 9,049,743 B1 | 6/2015 | Rao | 370/338 |
| 2001/0006517 A1 | 7/2001 | Lin et al. | |
| 2002/0084889 A1 | 7/2002 | Bolavage et al. | |
| 2002/0126745 A1 | 9/2002 | Prysby et al. | |
| 2002/0154705 A1 | 10/2002 | Walton et al. | 375/267 |
| 2002/0171581 A1 | 11/2002 | Sheynblat | 342/357.09 |
| 2005/0220086 A1 | 10/2005 | Dowling | 370/352 |
| 2006/0023666 A1 | 2/2006 | Jalali et al. | |
| 2010/0190453 A1 | 7/2010 | Rofougaran | 455/75 |
| 2010/0260063 A1 | 10/2010 | Kubler et al. | |
| 2011/0038637 A1 | 2/2011 | Rao et al. | |

OTHER PUBLICATIONS

U.S. Appl. No. 13/621,294, filed Sep. 17, 2012; Inventor: Sunil K. Rao.

U.S. Appl. No. 14/628,883, filed Feb. 23, 2015; Inventor: Sanjay K. Rao.

U.S. Appl. No. 14/685,592, filed Apr. 13, 2015; Inventor: Sanjay K. Rao.

U.S. Appl. No. 14/709,428, filed May 11, 2015; Inventor: Sanjay K. Rao.

* cited by examiner

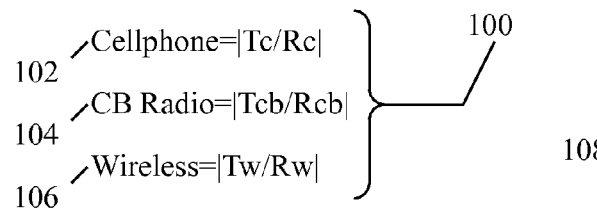
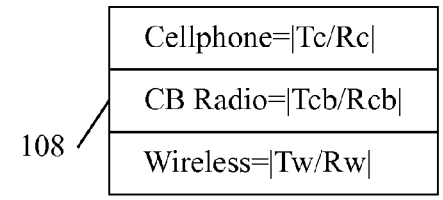
FIG. 1A
-Prior Art-
FIG. 1B
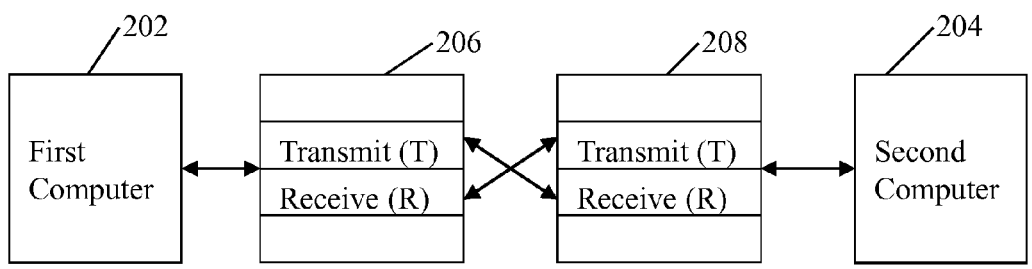
FIG. 2
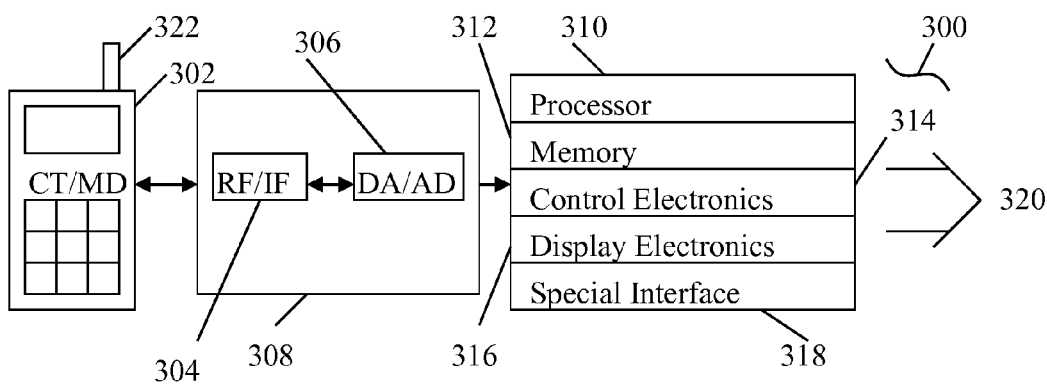
FIG. 3
-Prior Art-

SERVER CONTROL AND DEFINED SOFTWARE NETWORKING

CROSS REFERENCE TO RELATED APPLICATIONS

The present application is a continuation and claims the priority benefit of U.S. patent application Ser. No. 14/493,343, filed on Sep. 22, 2014, now U.S. Pat. No. 8,982,863 issued Mar. 17, 2015, which is a continuation of U.S. patent application Ser. No. 14/139,817, filed Dec. 23, 2013, now U.S. Pat. No. 8,842,653 issued Sep. 23, 2014, which is a continuation of U.S. patent application Ser. No. 12/912,607, filed Oct. 26, 2010, now U.S. Pat. No. 8,824,434 issued Sep. 2, 2014, which is a continuation of patent application Ser. No. 10/940,428, filed Sep. 13, 2004, now U.S. Pat. No. 7,848,300 issued Dec. 7, 2010, which is a continuation of patent application Ser. No. 09/617,608, filed on Jul. 17, 2000, now U.S. Pat. No. 7,286,502 issued Oct. 23, 2007; the disclosures of all the above referenced matters are herein incorporated by reference in the entirety. In addition, the contents of U.S. patent application Ser. No. 09/281,739, filed Jun. 4, 1999, now U.S. Pat. No. 6,169,789 issued Jan. 2, 2001, are incorporated by reference as if set forth here in full.

BACKGROUND OF THE INVENTION

ABBREVIATIONS: Cellular Telephone as CT. Mobile Device as MD. Non- Wireless Device as NWD. Internet Protocol as IP. The typical cellular telephone/mobile device (CT/MD) today has a single antenna, which is directly connected to a single receiver. While spread spectrum techniques often used in the CT/MD use a broad band of frequencies, at any specific point in time, only a single frequency connected to one receiver is used. While spread spectrum techniques greatly increase the reliability and stability of the transmission, signal "fade" and communication disconnects are often encountered. Some communications systems may rely on two separate systems; one at a high frequency and preferably using spread spectrum transmissions for clarity and reliability, and another providing a different set of frequencies, such as lower frequencies. The secondary system is used when signal fade is a problem in the main system. These are two separate, complementary systems, each devoted to solving a separate, distinguishable problem.

SUMMARY OF THE INVENTION

It is an object of the present invention to provide wireless enhancements to IP based cellular telephones/mobile wireless devices (CT/MD). The same enhancements are applied to IP based and locally based network switch boxes.

The typical CT/MD has one transmitter and one receiver (T/R), with one antenna. An unfulfilled need exists for multiple T/R in a CT/MD, providing enhanced capabilities, and the multiple T/R capabilities will often be best met with multiple antennas. The present invention is possible due to advances in the art which allow the necessary components to be integrated, with the size shrunk to achieve the package, performance, and cost desired. The multiple T/R capability allows the single CT/MD to perform tasks in different environments - each T/R being specifically designed or configured for that specific purpose.

Other objects, features and advantages of the present invention will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the invention and, together with the description, serve to explain the principles of the present invention:

FIG. 1A illustrates characteristics of a cellular telephone (CT/MD) of the prior art as opposed to a desired CT /MD of the present invention. FIG. 1B shows the CT/MD has three transmit frequencies and three receive frequencies.

FIG. 2 illustrates an embodiment of the present invention for a communication system with data being transferred from computer to computer.

FIG. 3 illustrates characteristics of the prior art showing a computer to computer data path with one channel.

Network (VPN).

Figure 13:
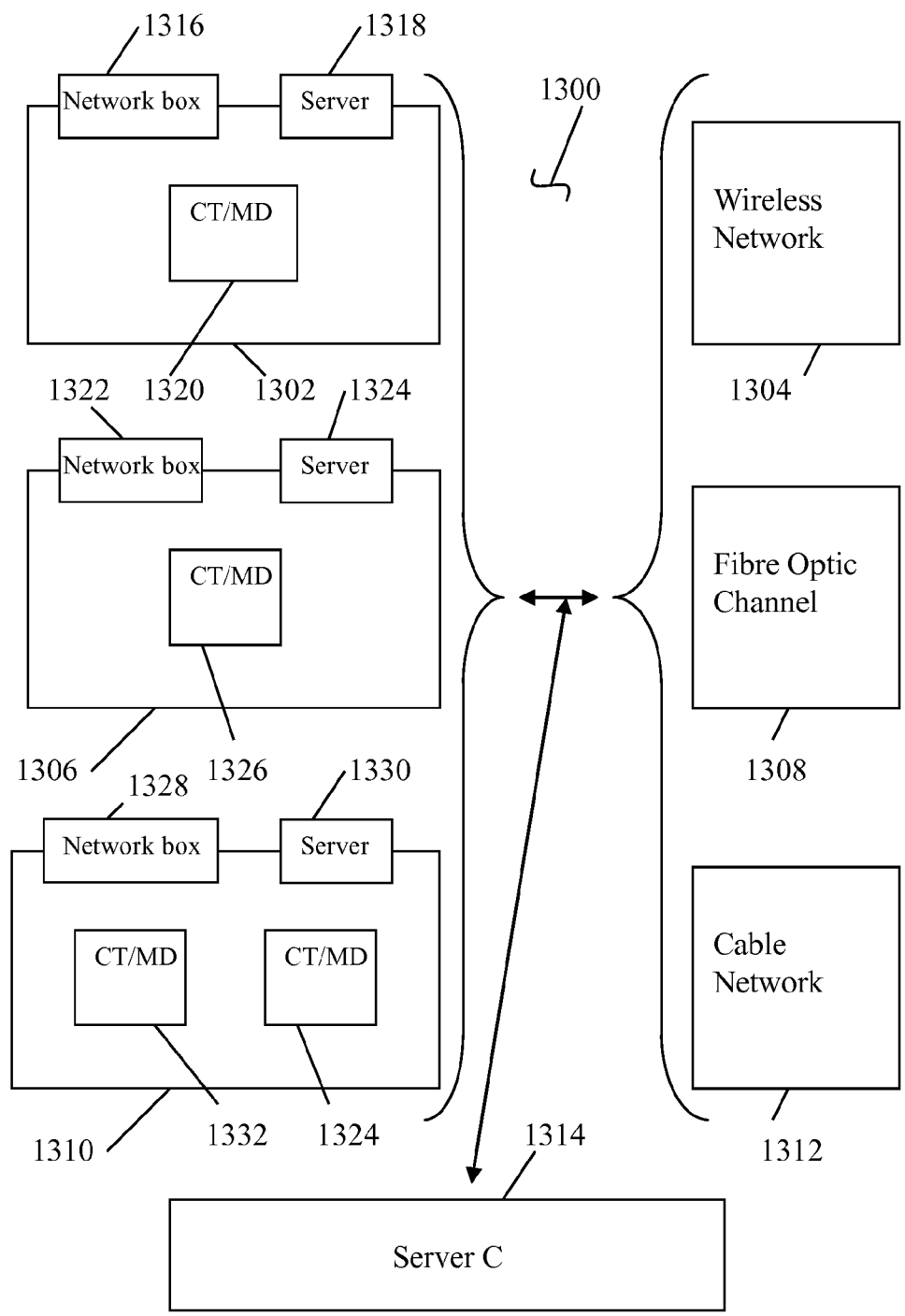

FIG. 13 is an embodiment of the present invention showing how Virtual Private Network or Networks (VPN) system may be provided.

DETAILED DESCRIPTION OF THE INVENTION

Reference will now be made in detail to preferred embodiments of the invention, with examples illustrated in the accompanying drawings. The invention is described in conjunction with the preferred embodiments, however, it will be understood that the preferred embodiments are not intended to limit the invention. The invention is intended to cover alternatives, modifications and equivalents included, now or later, within the spirit and scope of the present invention as defined by the appended claims.

In the present invention, one or more antennas and T/R units in a CT/MD will provide better tuning and greater bandwidth for a given frequency/application. For example, consider an embodiment of a cell phone, CB radio, and wireless phone, all in a single CT/MD for improving the data rates of a wireless device/network:

It is seen that the data rate of the CT/MD is increased. Currently the CT/MD data rates are very low and pose a severe limitation for high speed wireless data networking 14.4 KBPS (kilobits per second) is probably the best reliable speed for a wireless network that is commercially available. The speed at which RF waves are transmitted from point A to point B is a physical property based on the frequency of transmission and reception in a given medium such as air. The signal speed is determined by the frequency and the signal strength is determined by the power, line of sight, interference, etc. In a given assigned frequency band, the data speed is fixed but the power may be varied. The rate at which data may be transmitted over a wireless network is also determined by the ability to encode and decode the signal at the T/R ends using the electronics and computing power resident at each end.

Data transferred to a CT/MD over a wireless network comes in encoded form and must be decoded at the CT/MD after the data is received, such as by a receiver. The ability to encode and decode the data is a function of the number of encoders/decoders available and assigned to the task at the CT/MD or at a network switch box. It will be appreciated that while a CT/MD and a network switch box are very similar in many ways, they are completely different functional units, with the CT/MD providing personal services and the network switch box providing system services. The ability to encode and decode the data is also a function of the speed at which the encoder/decoder electronics operate at the T/R ends. Of course, each encoder/decoder must be associated with appropriate electronics to effect this task when more than one encoder/decoder is used.

FIG. 1A illustrates characteristics of a cellular telephone/mobile device (CT/MD) 100 of the prior art as opposed to a desired CT/MD of the present invention having multiple transmit/receive (T/R) units and multiple antennas. In FIG. 1A, Cellphone 102, CB Radio 104, and Wireless 106 of the prior art all have a single transmit frequency and a single receive 15 frequency. In contrast, the CT/MD 108 of FIG. 1B of this embodiment of the present invention has three transmit frequencies and three receive frequencies.

FIG. 2 illustrates an embodiment of the present invention for a communication system 200 with data being transferred from computer 202 to computer 204. In FIG. 2, computer 202 communicates through a system of T/R units 206, located within or in proximity to computer system 202, with computer system 204 through T/R unit 208. T/R 208 may be located within computer system 204 or in close proximity to computer system 204 to route the data to computer 204 or alternatively to a network server 204, as required. The rate at which data from system 202 to system 204 is transferred is gated by the speed of the transmit and receive units is improved by the parallel paths provided by the present invention. The signal is sampled and may be multiplexed at each end, at a rate that assures accuracy.

FIG. 3 is an embodiment of the prior art showing a computer to computer data path with a single channel 300. In FIG. 3, using a single antenna and a single T/R unit the signal is processed through the internal electronics module 308 of the CT/MD 302, said module 308, which is shown separate from CT/MD 302 for illustrative purposes only but is normally included within CT/MD 302. Module 308 contains RF/IF 304 and A/D, D/A converter 306, as well as processor 310, memory 312, control electronics 314, and other electronics such as display electronics 316 and special interface circuitry 318, such as for driving the output 320. It should be clear that output 320 can also be an input/output for the CT/MD 302. This is also true for a network switch box such as network switch box 552 with the functionality of CT/MD 302. The module 308 and elements 310 through 318 are included within CT/MD 302 or network switch box 552. All of these components or systems are normally contained within CT/MD 302. Since there is only one path, however, it is clear that this system does not form an efficient, convenient interface. The transmission data rate is limited by antenna 322 of CT/MD 302, which has only one antenna 322.

The antenna 322 is capable of receiving only a limited frequency band due to its design limitations, which are common to single antennas used for this purpose.

Adding additional antennas gives the CT/MD (by extension the same is true for the network switch box) enhanced capabilities to differentiate between various signals or to combine multiple paths into a single communication channel. As an example, the design considerations for receiving cellular telephone frequencies may be totally different from those for streaming video or data signals, and with the present invention both can be combined into the CT/MD.

Figure 4:
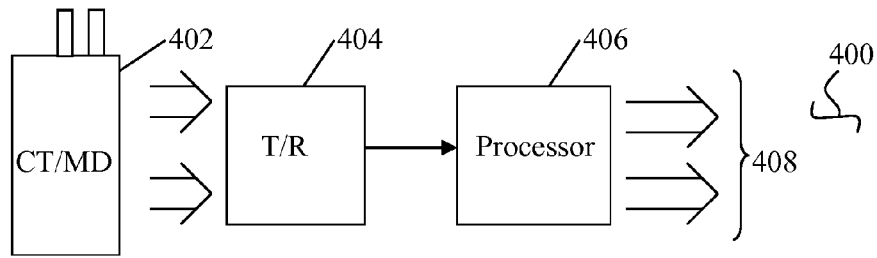
FIG. 4 illustrates a dual antenna, dual transmit/receive (T/R) unit in the CT/MD of the present invention in a dual band system.

FIG. 4 illustrates a dual antenna, dual T/R unit in the CT/MD of the present invention in a dual band system 400. In FIG. 4, this scheme with CT/MD 402 transmitting on the dual T/R unit 404 allows the internal processor 406 to independently process the two incoming signal streams separately and optimally, causing the appropriate output to be delivered on the desired output port. In FIG. 4 the processor 406 is shown as a single processor, however, the processor 406 is not limited to only one processor and may contain multiple processors. Alternately, the single processor may have multiple channels for parallel processing of each data stream to process accurately two distinct signals 408 that were more optimally received by two dedicated antennas and two separate T/R units contained within the CT/MD to improve performance and quality of output. An example is a CT/MD 402 which is optimized for video and voice.

Having more than one T/R unit gives a performance edge as each signal can be better processed and tuned to the specific frequency band of the signal. Thus better quality of output can be achieved for each type of signal and application. As an example, by having each of the data streams sampled at differing clock frequencies the performance can be better optimized.

Figure 5A:
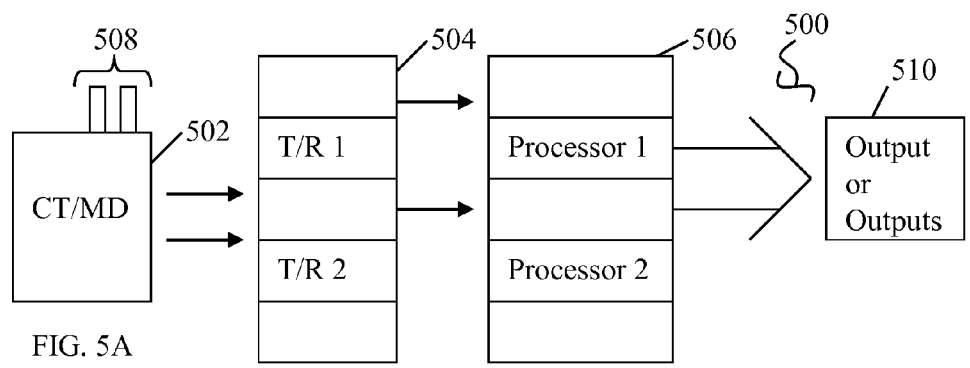
FIG. 5A illustrates a dual antenna, dual T/R unit in a CT/MD interfacing with a dual processor in the present invention in a dual band system.

FIG. 5A illustrates a dual antenna, dual T/R unit 504 in a CT/MD 502 interfacing with a dual processor 506 in the present invention in a dual band system 500. In FIG. 5A, in addition to multiple antennas 508 and multiple T/R units 504 the figure also shows multiple processors 506 in a process unit functional block in a CT/MD. The system may communicate through an output or outputs 510. For example, these outputs may be fibre optic channel, ethernet, cable, telephone, or other. By extension the feature of multiple antennas, multiple T/R units and multiple processors is extendable to the network switch box or network switch boxes that form a local, wide area, Virtual private network or connect to the Internet.

Server C controls the communication protocols in conjunction with the network switching box or other devices, such as CT/MD 502. The multiple processors 506 allow for parallel and custom processing of each signal or data stream to achieve higher speed and better quality of output. This can also be done with a single processor that has the parallelism and pipeline capability built in for handling one or more data streams simultaneously. Processor 506 is the complete electronics inclusive of DSP, CPU, memory controller, and other elements essential to process various types of signals. These can be defined as, for example, either single chip or multichip solutions. The processor contained within the CT/MD 502 is further capable of delivering the required outputs to a number of different ports such as optical, USB, cable and others such as 1202 to 1210. The CT/MD 502 is also capable of taking different inputs, as well as wireless, for the appropriate processing to be done on these signals within the CT/MD 502 and outputting the desired signal on a designated port or ports. Thus the CT/MD 502 has universal connectivity in addition to having a wide range of functionality made possible through the features of multiple antennas, multiple T/R units 504 and processors 506 in this invention. These features may also exist in a network switch box, such as network switch box 552.

Figure 5B:
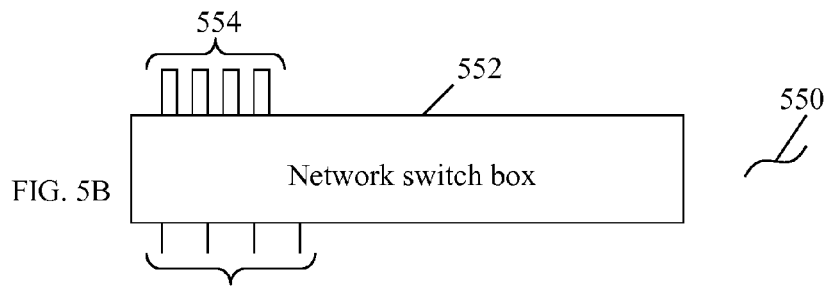
FIG. 5B illustrates a wide band network switch box system that is capable of operating in a number of network environments sequentially or simultaneously.

FIG. 5B illustrates a wide band network switch box system 550 that is capable of operating in a number of network environments sequentially or simultaneously. The network switch box is configured with multiple processors, multiple antennas and multiple T/R units that can be multiplexed to process incoming and outgoing wireless signals. In addition to wireless signals there is a need to process other types of input/output signals such as optical, cable, USB etc. to fully interface with other types of devices and networks. The network switch box is normally a fixed part of a network, whereas the CT/MD is portable. However, the network switch box may be portable and may be used in the wireless mode only in a wireless network or it may also be connected to one or more networks by wired and wireless means to fully leverage all the input/output ports.

In FIG. 5B, network switch box 552 that is limited in quality because of the limitations of wireless may fully leverage the networks, including fibre optic networks, such as by multiple antennas 554 and multiple I/O ports 556. As an example, the ability to view streaming video on a network switch box 552 may be limited by the wireless signal quality due to the need for compression. This is due to transmissions that are inherently impaired in air as opposed to fibre optic cable. A prior art network switch box while in the mobile mode may receive video of poorer quality. The network switch box 552, when at home or in the office, could be easily connected to the optical network directly or through I/O ports 556, such as by a cradle adapter. In this mode the best data, video or audio quality can be received using the same unit. This provides the network switch box 552 single unit to have universal applications since it can sequentially or simultaneously communicate optimally with other systems and networks to deliver quality/performance and speed tailored for each application.

The network switch box 552 as disclosed above executes substantially the same function as the CT/MD 502. However, the network switch box 552 operates at a network system level capable of coordinating the operations of a number of mobile and other devices in one or more networks, while the CT/MD 502 performs at a personal level.

Figure 6:
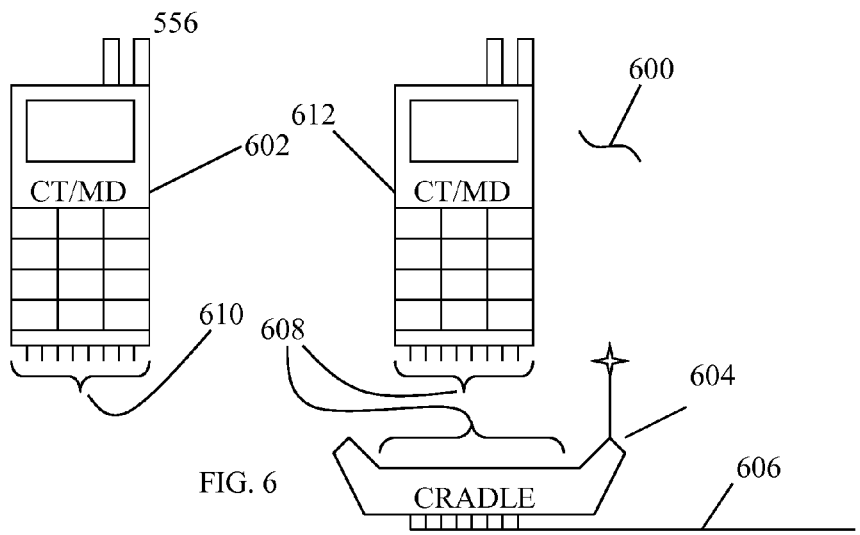
FIG. 6 is an embodiment of the present invention showing a wired interface system for wireless or non-wireless devices and including a wireless cradle adapter.

FIG. 6 is an embodiment of the present invention showing a wired interface system 600 for wireless or non-wireless devices. In FIG. 6, a wireless device, CT/MD 602 with I/O ports 610 and CT/MD 612 with the ability to interface through a cradle adapter 604 having both wireless and wired connections 606 interfacing with multiple input/output (I/O) ports 608 is shown. One, all, or some of the connections may be used simultaneously or sequentially for combining multiple data paths into a single path. Whether to combine all the paths into a single data channel or use separate data channels for simultaneous operations will be based on the needs of the application. Examples of inputs/outputs are, for example, standard telephone, coaxial cable, Ethernet, twisted pair, wireless, optical, and USB. In addition to the multiple I/O ports 610 shown on the CT/MD 602 and the ports 608 shown for connecting the CT/MD 612 to cradle adapter 604, the present invention anticipates a universal port and a universal connector. By having the signal path selection done by user defined menu driven software and multiplexing the signals onto a universal input/output port as opposed to the multiple ports 608, 610 or wired connections 606, the desired signals are delivered to the universal port.

Note that the cradle adapter 604 connection also allows I/O contacts 608 between a non-wireless device (NWD) 613 and a wireless cradle adapter 604 or similar wireless enabling attachment. The enabling attachment can make any non-wireless device (NWD) unit 613 wireless enabled while being plugged into the cradle adapter 604, as shown for CT/MD 612, to access a number of wired, optical or wireless communication paths through the ports 608. The cradle adapter itself may have multiple antennas, multiple T/R units and multiple processors built-in to deliver full functionality. The cradle adapter 604 may also accommodate multiple wired or wireless devices to be plugged in at the same time. The cradle adapter may also contain power ports for the individual devices in addition to the I/O ports. The cradle adapter 604 may be a passive pass through connection enabling device or may have internal electronic smarts to perform certain server functions to control data traffic. Alternately, a Server C located on a LAN, WAN or the Internet can be the control vehicle.

Figure 7:
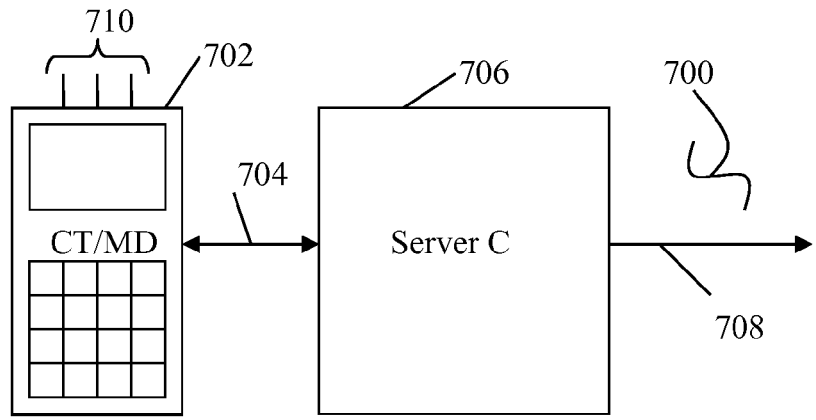
FIG. 7 is an embodiment of the present invention showing a CT/MD with multiple T/R units and multiple antennas in a communication system connecting to a Server C through a wireless connection.

FIG. 7 is an embodiment of the present invention showing a CT/MD 702 having multiple T/R units internally and with multiple antennas 710 in a communication system 700 connecting to a Server C 706 through a wireless connection 704. Server C 706 then communicates with a network such as the Internet or other path to data such as a local WAN/LAN line, etc., through connection 708. The multiple T/R units and antennas 710 allow multiple simultaneous communication paths over connection 704 between the CT/MD and the Server C such that the communication rate is increased.

Figure 8:
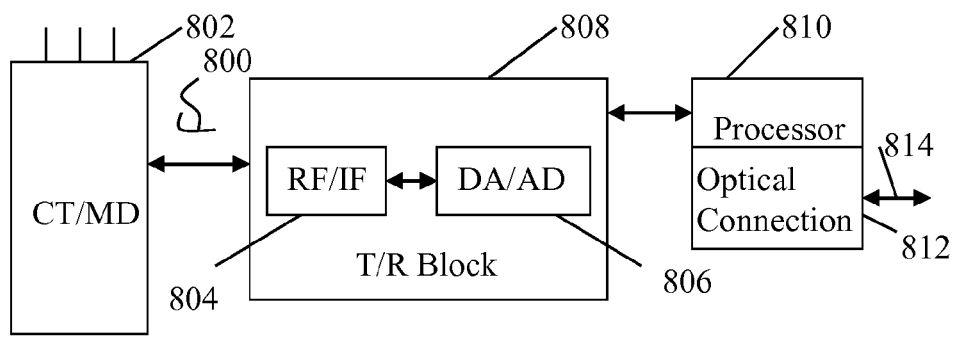
FIG. 8 is an embodiment of the present invention illustrating the connection of multiple wireless signals to an optical network for connection to a wide area network (WAN) or local area network (LAN) or to the Internet.

FIG. 8 is an embodiment of the present invention illustrating the connection of multiple wireless signals to an optical network for connection to a wide area network (WAN) or local area network (LAN) or to the Internet. In FIG. 8, a CT/MD 802 communicates through internal electronic interfaces, such as an RF/IF module 804 and an AD/DA unit 806 in a T/R block 808 with a processor 810. Processor 810 then provides an electrical signal generated by the T/R block 808 and processed by processor 810 to an optical converter (OC) 812. OC 812 then delivers the optical signal to fibre optic cable 814 for delivery to, for example, a network such as a WAN/LAN or the Internet.

This avoids delay in processing the signal and improves quality/performance. Similar conversions can be done by the processor for other input/output protocols or systems such as universal serial bus (USB) or Ethernet either locally or in conjunction with a server such as Server C 706 to receive/deliver input output signals as needed. By extension, the same features are possible for the network switch box such as network switch box 552.

Some unique features of the present invention, which apply to either a CT/MD such as CT/MD 802 or to a network switch box such as network switch box 552, are:

Multiple antennas for greater signal range and bandwidth.
Multiple T/R units so that paths or tasks can be paralleled.
Multiple internal signal processors, or one or more processors that execute in parallel.
Multiple built in input/outputs for universal connectivity to different network environments.
Capability to interface wired and wireless devices through a cradle adapter to achieve universal connectivity.
Parallel processing of signals and data streams at a system level using hardware and software on a server such as Server C 706.

Figure 9:
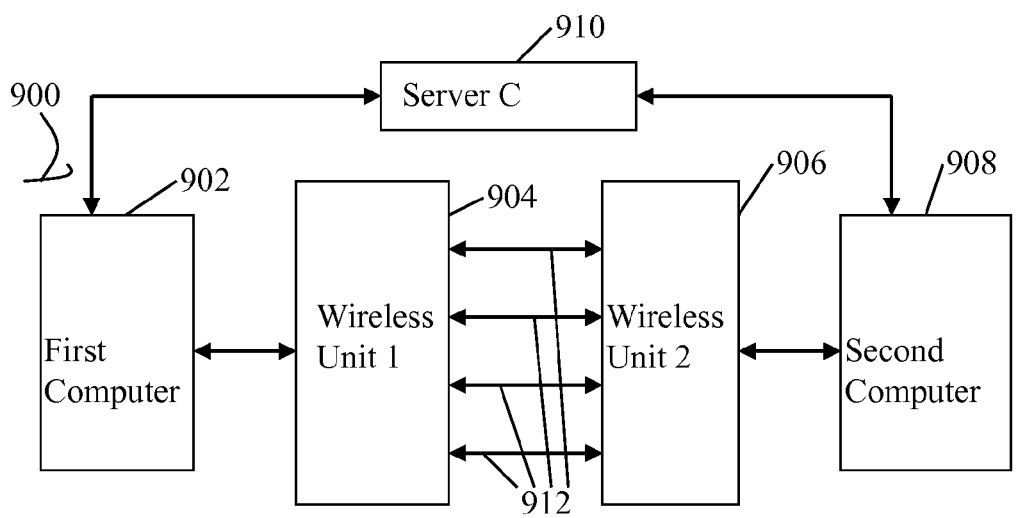
FIG. 9 is an embodiment of the present invention showing a multiple processing system.

FIG. 9 is an embodiment of the present invention showing a multiple processing system 900. In FIG. 9, computer 902 and computer 908 need to exchange data streams at very fast rates. Having a single channel for T/R with a single antenna or a single processor would cause a limitation in data transfer rates, so multiple channels 912 are provided. Server C 910 polls the tasks by communicating with computer 902 and computer 908, and through computer 902 and computer 908 control the wireless units 904 and 906, such as CT/MDs or wireless boxes, by optimally allocating channels and transfers of the data. Having multiple channels 912 enhances the data transfer rate compared to a single channel or communication path. Server C 910 oversees the allocation of data to the different channels and keeps the process under control. In addition the multiple channels 912 help overcome the RF to digital electronic conversion rate problem. The rate at which the sampling and conversion takes place is a function of, for example, the A/D and D/A 806 conversion rates and limitations in the other electronics components such as processor 810. Consequently having the data partitioned by the Server C 910 and assigned to multiple channels 912 enables parallel processing of the communications, and having parallel processing of wireless data streams where the data streams coexist, as in the present invention, increases the data transfer rate.

Figure 10:
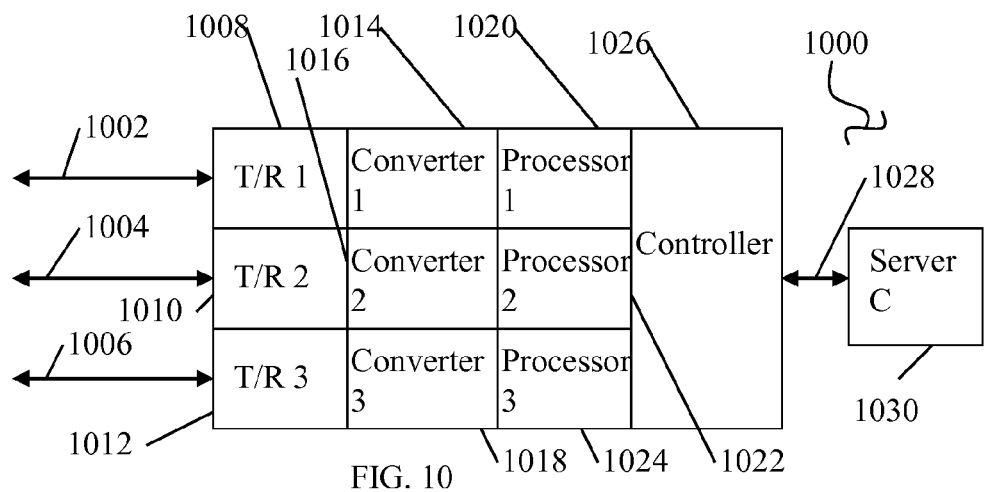
FIG. 10 is an embodiment of the present invention showing a data system with three data streams.

FIG. 10 is an embodiment of the present invention showing a data system 1000 with three data streams DS1 1002, DS2 1004 and DS3 1006. In FIG. 10, three wireless T/R units 1008, 1010, and 1012 are shown. The three data streams 1002, 1004, and 1006 are processed by the three T/R units 1008, 1010 and 1012, converted by converters 1014, 1016, and 1018, and presented to processors 1020, 1022, and 1024 under the control of controller 1026. The data streams may be interfaced separately with server C 1030 or combined into data stream 1028 and interfaced to Server C 1030. The processor or CPU speed is seldom a limiting factor, so the improvement in speed by providing multiple data paths is fully realized by the present invention.

Each subtask being processed can be assigned to a separate channel. The rate at which the data is acquired, processed and converted is dependent on the type of electronic components. Therefore, component limitations can be overcome in a straightforward and convenient way by parallel processing. In such cases, the processor speed is seldom a limitation, and conversion speed of RF to electrical and electrical to RF, becomes the primary bottleneck in data transfers for wireless systems. By providing, for example, a single chip, multichip, or hybrid converter for parallel conversions in accordance with the present invention under the supervision of the Server C 910, this bottleneck is avoided. Each channel may be sampled and clocked individually as necessary to optimally process each data stream and combine the individual data packets.

Figure 11:
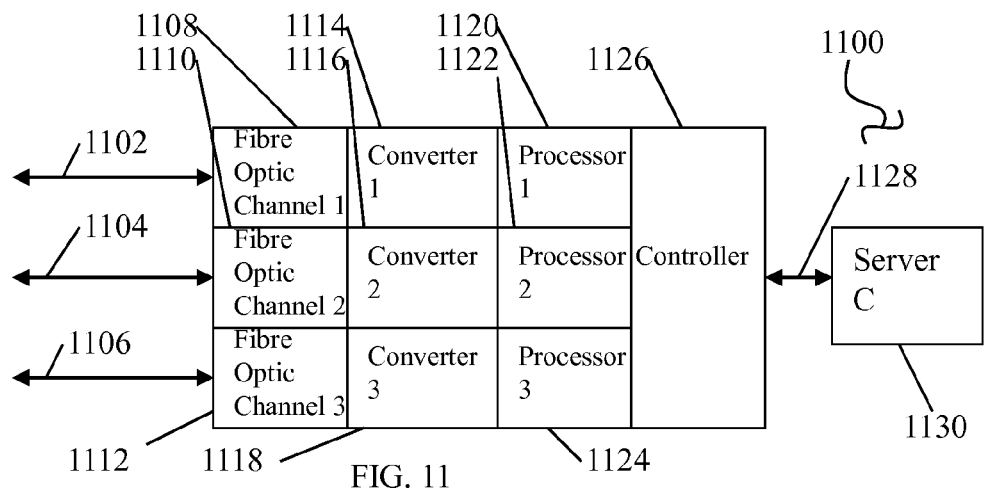
FIG. 11 is an embodiment of the present invention showing a data system with three data streams.

FIG. 11 is an embodiment of the present invention showing a data system 1100 with three data streams DS1 1102, DS2 1104 and DS3 1106. In FIG. 11, three fibre optic channel units 1108, 1110, and 1112 are shown. The three data streams 1102, 1104, and 1106 are processed by the three fibre optic channel units 1108, 1110 and 1112, converted by converters 1114, 1116, and 1118, and presented to processors 1120, 1122, and 1124 under the control of controller 1126. The data streams are combined into data stream 1128 and interfaced to Server C 1130. The processor or CPU speed is seldom a limiting factor, and can be overcome by providing multiple processors as shown, including for Server C 1130, so the improvement in speed is fully realized by the present invention. Each subtask being processed can be assigned to a separate optical fibre optic channel. The rate at which the data is acquired, processed and converted is limited by the components used for conversion of optical to electrical and electrical to optical signals. Therefore, component limitations can be overcome in a straightforward and convenient way by parallel processing. This can be especially important with fibre optic transmissions, where fibre optic to electrical and electrical to fibre optic conversions can create significant communications limitations. In such cases, the processor speed is seldom a limitation or can be overcome with parallel processors, and conversion speed becomes the primary bottleneck in data transfers for optical systems. As discussed before, by providing, for example, a single chip, multichip, or hybrid converter for parallel conversions in accordance with the present invention under the supervision of a Server C, such as Server C 1130, the fibre optic channel conversion bottleneck is avoided.

Figure 12:
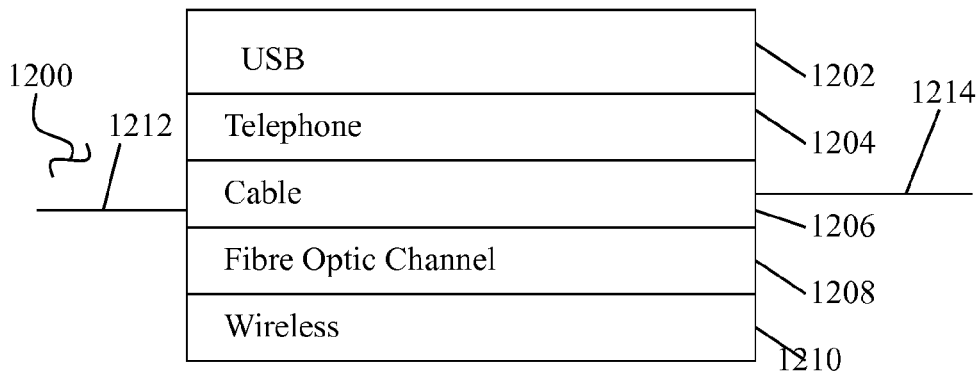
FIG. 12 is an embodiment of the present invention showing a Virtual Private

FIG. 12 is an embodiment of the present invention showing a Virtual Private Network (VPN) communication path 1200. In FIG. 12, multiple communications channels such as USB 1202, telephone 1204, cable 1206, fibre optic channel 1208, and wireless 1210 are all employed to communicate data relating to tasks and subtasks from data path 1212, such as from Server C 1130, to data path 1214. Data path 1214 may be connected to, for example, another Server C 1030 or similarly. The result is that multiple communication environments are enabled by the data paths 1200, the environments having, for example, devices such as multiple CT/MDs, network switch boxes, and combinations for forming a VPN, such as VPN 1302. This is true even where the individual units belong to another VPN. The VPN, such as VPN 1302, or several VPNs, such as VPNs 1300, can be under the control of a single or multiple Server C, such as Server C 1130, machines. Each device in a VPN such as VPN 1300 may operate wireless or wired devices such as the devices in VPN 1302 connected to other wired or wireless networks, including fibre optic channel networks. The devices in a VPN, such as VPN 1302 of the present invention can be multiplexed or multitasked by a Server C, such as Server C 1130. This allows many such devices to be under the supervision and control of a Server C 1130 or multiple Server C machines such as Server C 1030, 1130.

FIG. 13 is an embodiment of the present invention showing how Virtual Private

Network or Networks (VPN) system 1300 may be provided. In FIG. 13, VPN 1302, 1306, and 1310 are connected through a wide area network (WAN) or local area network (LAN) to wireless network 1304, optical network, such as a fibre optic channel 1308, and cable network 1312. Other networks could be used as well, the embodiment is not intended to restrict the present invention. All the VPNs such as VPN 1302 and optionally the connections may be under the supervision of a Server C 1314 or many servers. VPN 1302 is shown with a network switch box 1316, server 1318, and a CT/MD 1320, which allows multipath communication through the network switch box 1316 to server 1318. This allows communication from/to the network switch box or from/to an outside source, such as a CT/MD service provider, to CT/MD 1320. The CT/MD 1320 can communicate simultaneously with the network switch box 1316 and an outside source as well.

VPN 1306 shows network switch box 1322 communicating with a server 1324 and optionally with CT/MD 1326. As shown, the VPN 1302 and the VPN 1306 operate in parallel, and may both be under the supervision and control of server 1314, which acts as a sort of executive level supervisor.

VPN 1310 shows network switch box 1328 and server 1330, with both CT/MD 1332 and CT/MD 1334 in the VPN 1310. Network box 1328 may communicate with either or both CT/MD 1332 and 1334, and CT/MD 1332 and CT/MD 1334 may intercommunicate as well. VPN 1310 may also be under the supervision and control of server 1314. The server 1314 may also control and supervise VPN 1302 and 1306.

The present invention includes the following features:

(1) A cellular telephone/mobile device (CT/MD) with two or more antennas as opposed to the current state of the art in a single antenna system. Each antenna may be specifically designed for a specific frequency or application or may be multiplexed for different uses.

(2) A CT/MD with two or more transmit/receive (T/R) units as opposed to the prior art single T/R unit. Each T/R unit in the CT/MD may be designed for a specific frequency or application or may be multiplexed for different uses.

(3) A CT/MD with two or more processor units (or a single processor unit with built in parallelism to execute same, different and or custom applications) as opposed to the prior art of a single processor unit. Each processor unit in the CT/MD may be designed for a specific application or may be multiplexed for different uses. As an example one processor may be specifically designed to handle voice, another for data, another for high quality audio and yet another for streaming video.

(4) A CT/MD that has multiple input/output ports as opposed to a single input/output (I/O) port as in the prior art. The CT/MD may have a universal serial bus (USB) port, a coaxial cable port, a standard telephone (POTS) port, a twisted pair port, Ethernet port, and most importantly an optical port. The CT/MD thus can fully interface and interact with different environments sequentially or simultaneously. The feature is more than one port being available with variations in the number of ports (I/O) from one to N.

(5) A network switch box with two or more antennas as opposed to the prior art of a single antenna system. Each antenna may be specifically designed for an assigned frequency or application or may be multiplexed for different uses.

(6) A network switch box with two or more T/R units within it as opposed to the prior art of a single T/R unit. Each T/R unit may be designed for an assigned frequency or application or may be multiplexed for different uses.

(7) A network switch box with two or more processor units (or a single processor unit with built in parallelism to execute same, different and or custom applications) as opposed to the prior art of a single processor unit. Each processor unit in the network box may be designed for a specific application or may be multiplexed for different uses. As an example one processor may be specifically designed to handle voice, another for data, another for high quality audio and yet another for streaming video.

(8) A network switch box has multiple input/output ports as opposed to a single input/output (I/O) port as in the prior art. The network switch box may have a universal serial bus (USB) port, a coaxial cable port, a standard telephone (POTS) port, a twisted pair port, Ethernet port, and most importantly an optical port. The network switch box thus can fully interface and interact with different environments sequentially or simultaneously. The feature is more than one port being available with variations in the number of ports (I/O) from one to N.

(9) The ability to use the same CT/MD in different environments and applications and the ability to quickly interface to various inputs and outputs by a quick and easy plug in method into a receptacle or socket or by wired or wireless means such as a docking station.

(10) The ability to use the same network switch box in different environments and applications and the ability to quickly interface to various inputs and outputs by a quick and easy plug in method into a receptacle or socket or by wired or wireless means such as a docking station.

(11) The CT/MD and the network switch box may be used for communication, control, command, compute, entertainment, gaming, or other applications that may be defined in the future for both wireless and wired equipment.

(12) The unique feature that allows one or more antennas, one or more T/R units, one or more processors and one or more input/outputs to coexist in totality or as subsets of any combination of the above in one single CT/MD or a network switch box.

(13) The feature described in item 10 above and this invention allows parallel processing of the signals and data streams through the antennas, through the T/R units, through the multiple processors and through the I/O. This allows the present invention to achieve faster data rates with flexible connections for making multiple applications sequentially or simultaneously available using the same CT/MD or network switch box. As an example, video, audio and other uses can be accessed simultaneously with performance optimized for each through dedicated or multiplexed antenna paths, T/R paths, through multiple processors and I/O paths.

(14) The internal electronics of a CT/MD or a network switch box other than the antenna, T/R and I/O may be shared or separate. For example, the processor, memory, etc. may be common or may be separate as defined by the application, cost, and site, etc.

(15) The ability to have an internal IP based web server function within the CT/MD and the network switch box or an external server C connected by wired or wireless means to keep track of all the communication protocols within the unit and with the outside world and other units.

(16) The electronics that converts wireless to optical signals directly, to efficiently interface wireless and optical signals and systems without intermediate transport.

(17) The ability to process in parallel signals derived from optical signals such as at a much higher frequency.

(18) The attachment that makes a non-wireless device fully wireless (see FIG. 6).

(19) The ability to form many concentric/overlaying networks and have the CT/MD exist in one or more wired or wireless networks simultaneously. Thus one single CT/MD can, at the same time, be part of one or more wired or wireless VPN (virtual private networks) or of a public network. Thus a mixed network, a mixed VPN, is dynamically made possible under the supervision of server C. In this mixed VPN one or more network boxes from different networks, different CT/MDs and base stations coexist in a new virtual network. All of these VPNs, mixed VPNs and public networks being accessible by the CT/MD through the supervision of the central server C located on a LAN, WAN, or the Internet.

(20) The ability for a CT/MD to communicate with one or more CT/MDs and other wired or wireless devices in one or more VPNs and public networks directly allowing for paging and data transmission and communication between one or more CT/MDs. This is accomplished with all the VPNs being under the control of Server C located on a LAN, WAN or the Internet.

(21) The network box may also operate as a wireless base station, with the characteristics enumerated for the network box, such as multiple antennas, multiple T/R units, multiple processors and multiple I/O ports. The base station may receive inputs from one type of network and transmit to another type of network seamlessly. For example, an optical network input may be transmitted as a wireless RF output over the wireless network. In reverse the wireless input to base station may be seamlessly converted into optical output for transmission over an optical network.

(22) In either the base station configuration or the network box configuration, the units have the ability to take optical data and multiplex the data for wireless transmission over one or more channels, at one or more frequencies and power levels. The base station, the network box or the CT/MD may use one or more transmission protocols as deemed optimal and appropriate by the local server C or the super server C located in a LAN, WAN or the Internet. Thus the base station unit, the network box and the CT/MD determines the required frequency spectrum, other wireless parameters such as power and signal to noise ratio to optimally transmit the data. In addition the units have the ability to multiplex between one or more transmission protocols such as CDMA, TDMA to ensure that the fast data rates of the optical network or matched closely in a wireless network to minimize the potential data transmission speed degradation of a wireless network. As an example, the data path between two optical networks may involve a wireless hop due to physical constraints. In such a case the wireless hop transmission speed is likely to be a bottleneck. The base station or the network box, configured as described in the present invention at the hardware level offers universal functionality. In addition the software capability that is resident internally to the unit, at the local server C level or network server C level, is capable of dynamically determining a number of factors for best data transfer. As an example, the unit can determine the best transmission frequencies and protocols, determine the best error correction and channel coding algorithms and multiplexes the transmission paths and tasks. Thus it is possible that various optical and wireless protocols can co-exist in a network.

(23) The network box or network boxes may also be used to configure a predominantly optical network that has wireless capability as an adjunct or a predominantly wireless network that has optical capability as an adjunct. Other combinations are possible by extension with or without multiplexing. The optical to wireless multiplexer, can be part of a wireless ethernet or optical ethernet. Similarly other types of conversion and transmission multiplexers could be defined to be incorporated into the CT/MD, the network box or the base station to optimally and seamlessly transfer data between networks or within a network.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. A system for communication comprising:
a server enabled to communicate with at least one network; and wherein a plurality of network connections are under the supervision and/or control of the server; and
a network switch box, wherein the network switch box is configured with a plurality of ports, wherein the network switch box is connected to a plurality of networks by wired and/or wireless connectivity; wherein the network switch box is configured to transfer data between networks; and wherein the network switch box and a wireless device or a mobile device from different networks coexist in a virtual network;
and wherein a plurality of overlay networks are enabled such that the wireless device or the mobile device exists in one or more wired and/or wireless networks simultaneously; and wherein a software capability resident at the server or a network server is enabled to determine the control factors for the data transfer; and wherein a transmit and receive capability includes the route of data to or between one or more of a computer system or a network server system; and wherein the rate at which data is transferred from one or more systems is enabled by multiple communication paths.

2. The system of claim 1, wherein the network switch box is enabled to sequentially or simultaneously communicate with other systems and networks to deliver quality, performance, and/or speed tailored for a application.

3. The system of claim 2, wherein a controller is configured to control the network switch box to use a first network path to send at least one data packet to a second network switch box and to reconfigure the network switch box to use a second network path to send at least one data packet.

4. The system of claim 2, wherein the server is configured to dynamically control and change the network flow between the network switch box and a second network switch box such that the network switch box and the second network switch box transmit and receive data packets using dynamically changing network paths.

5. The system of claim 4, wherein the server is configured to control the network switch box to switch between a first network path and a second network path in response to a network condition.

6. The system of claim 2, wherein the server is configured to control the network switch box to switch between a first network path and a second network path in response to an application.

7. The system of claim 2, wherein the wireless device includes a video streaming application and the data communication comprises a video stream data.

8. The system of claim 2, further comprising at least two machines, wherein a machine generates a first data stream to send to the second machine via the network switch box and the second machine is configured to receive the first data stream from the network switch box.

9. The system of claim 2, wherein at least one machine is a virtual machine and/or at least one network switch box is a virtual switch; wherein at least one network is an overlay network, virtual network and/or virtual private network; and wherein the server is configured to send control parameters to the network switch box using at least one protocol.

10. The system of claim 2, wherein the server controller is configured to define one or more network paths between a device and at least one network switch box, and wherein the server controller is configured to define one or more routes between at least two network switch boxes.

11. A system for networks including a virtual network and a server comprising:
a first network switch box and a second network switch box, and wherein the first network switch box and the second network switch box are configured to operate on a plurality of networks, wherein the first network switch box and the second network switch box are configured with a wired and/or wireless capability; wherein the first network switch box and the second network switch box are configured to transmit and receive a plurality of data streams;

and wherein the server is configured for communication with the first network switch box and the second network switch box and a communication protocol to control the network path of the first network switch box and the second network switch box using a controller; wherein at least one network switch box and a wireless device from different networks coexist in a virtual network; and wherein said virtual network is under the supervision of the server;

and wherein a plurality of overlay networks are enabled such that a plurality of communication devices including the first network switch box and second network switch box exist in two or more wired or wireless networks simultaneously; and wherein a software capability resident on the server determines the control factors for the data transfer between the first network switch box and second network switch box including the route of data to a computer system or a network server system including wherein the rate at which data is transferred from one or more systems is configurable to include multiple paths to a remote system including a data path between two optical networks or a wireless hop or combinations thereof.

12. The system of claim 11, wherein a virtual private network is created between the first network switch box and the second network switch box, wherein a first data stream comprises data output on an Ethernet port and wherein the transmission of at least one data stream from one of the network switch boxes is over an optical connection; the system further comprising a plurality of virtual private networks, wherein the virtual private networks are under supervision and control of the server.

13. The system of claim 11, wherein a network data transmission path between at least one network switch box and a network device is changed responsive to the network quality requested by a specific application or responsive to the type of data in the data stream; the system further comprising, wherein the server and the first and second network switch boxes are configured to process multiple data streams and combine individual data packets; and wherein the server functions as a controller for processing the various data streams.

14. The system of claim 11, further enabled for flexible connections specific to a plurality of applications by configuring the data communication paths between the first network switch box and the second network switch box for communication.

15. The system of claim 11, wherein at least one network switch box is configured with a wireless transmit and receive component and a wired communication component and wherein the at least one network switch box is configured to receive a wireless signal and to stream process the wireless signal stream and transmit the wireless signal stream over an optical communication network.

16. The system of claim 11, wherein the server is configured with software stored in a non transitory computer readable medium to be executed by a processor on the server, wherein the software defines the optimal data path between at least two or more network switch boxes for a specific data stream flow.

17. The system of claim 11, wherein a data stream is transmitted from a first machine to a second machine, wherein a first data stream is output over Ethernet, wherein the first data stream is encapsulated or placed in an overlay network between the first and second machine to be transmitted as part of a second data stream, wherein the second data stream is transmitted and received using an Internet Protocol over a port, and wherein the second data stream is transmitted between the first network switch box and the second network switch box.

18. The system of claim 11, wherein a first machine and a second machine operate in a datacenter or cellular network for offload of wireless traffic to IP based networks, LAN or WAN network environment comprising of one or more of a virtual private network, a virtual network, and virtual devices or combinations thereof.

19. The system of claim 11, further comprising a plurality of protocols, switching protocols, routing protocols, network communication, interfaces, and machines methods including one or more of Internet protocol, UDP, VLANs, TCP, SSL, HTTP, https, transmission control, data streams, control streams, routing protocols, WiFi, Bluetooth, 802.11 abcgn or other versions, radio access networks, virtualization, packet forwarding, packet encapsulation, and virtual machines.

* * * * *